(12) United States Patent
Lee

(10) Patent No.: US 8,851,734 B2
(45) Date of Patent: Oct. 7, 2014

(54) LIGHT GUIDING FILM HAVING LIGHT EXTRACTION FEATURES

(75) Inventor: Junwon Lee, Webster, NY (US)

(73) Assignee: SKC Haas Display Films Co., Ltd. (KR)

(*) Notice: Subject to any disclaimer, the term of this patent is extended or adjusted under 35 U.S.C. 154(b) by 1652 days.

(21) Appl. No.: 12/079,535

(22) Filed: Mar. 27, 2008

(65) Prior Publication Data

US 2009/0244690 A1    Oct. 1, 2009

(51) Int. Cl.
*F21V 7/04* (2006.01)
*F21V 8/00* (2006.01)

(52) U.S. Cl.
CPC ............ *G02B 6/0036* (2013.01); *G02B 6/0061* (2013.01)
USPC ........................................ 362/619; 362/620

(58) Field of Classification Search
USPC ................................................ 362/619–620
See application file for complete search history.

(56) References Cited

U.S. PATENT DOCUMENTS

| | | | |
|---|---|---|---|
| 5,999,685 A | 12/1999 | Goto et al. | |
| 6,158,867 A | 12/2000 | Parker et al. | |
| 6,827,456 B2 * | 12/2004 | Parker et al. | 362/629 |
| 7,188,989 B2 | 3/2007 | Miyashita | |
| 7,618,164 B2 * | 11/2009 | Wang et al. | 362/339 |
| 2004/0085749 A1 | 5/2004 | Parker et al. | |
| 2005/0259939 A1 | 11/2005 | Rinko | |
| 2006/0256577 A1 | 11/2006 | Parker et al. | |
| 2007/0279727 A1 | 12/2007 | Gandhi et al. | |
| 2008/0013015 A1 | 1/2008 | Joo et al. | |

FOREIGN PATENT DOCUMENTS

| | | |
|---|---|---|
| EP | 1 016 817 B1 | 10/2003 |
| WO | WO 03/010560 A2 | 2/2003 |
| WO | WO 2006/052755 | 5/2006 |

OTHER PUBLICATIONS

European Search Report of corresponding European Application No. 09 15 4737, Jul. 2009.

* cited by examiner

*Primary Examiner* — Sean Gramling
(74) *Attorney, Agent, or Firm* — Cantor Colburn LLP

(57) ABSTRACT

A light-guiding article has a film substrate that has at least one patterned surface having a plurality of discrete surface features and an incident edge that is substantially orthogonal to the at least one patterned surface. Each surface feature in the plurality of discrete surface features extends along a length direction that is substantially parallel to the incident edge. Taken in cross-section along the length direction, each surface feature has a positively sloped portion, a substantially flat portion, and a negatively sloped portion. A first widthwise cross-section taken at a first position through the positively sloped portion has the same shape as a second widthwise cross-section taken at a second position through the negatively sloped portion.

6 Claims, 25 Drawing Sheets

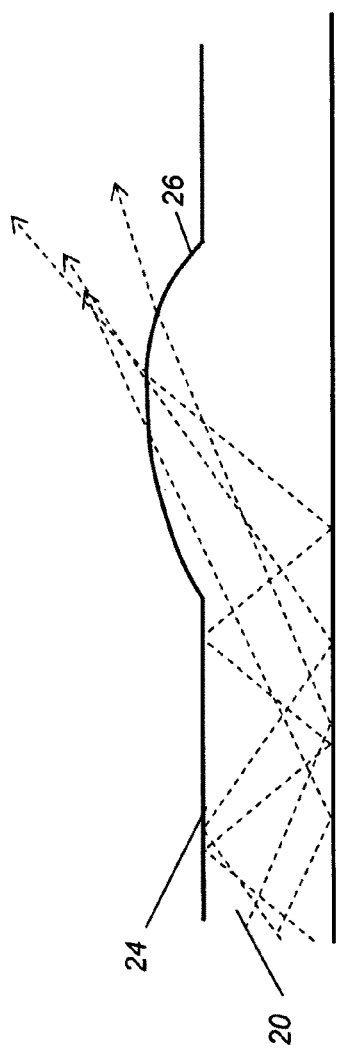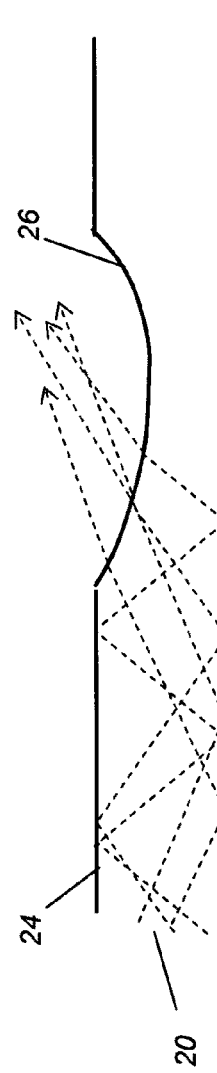

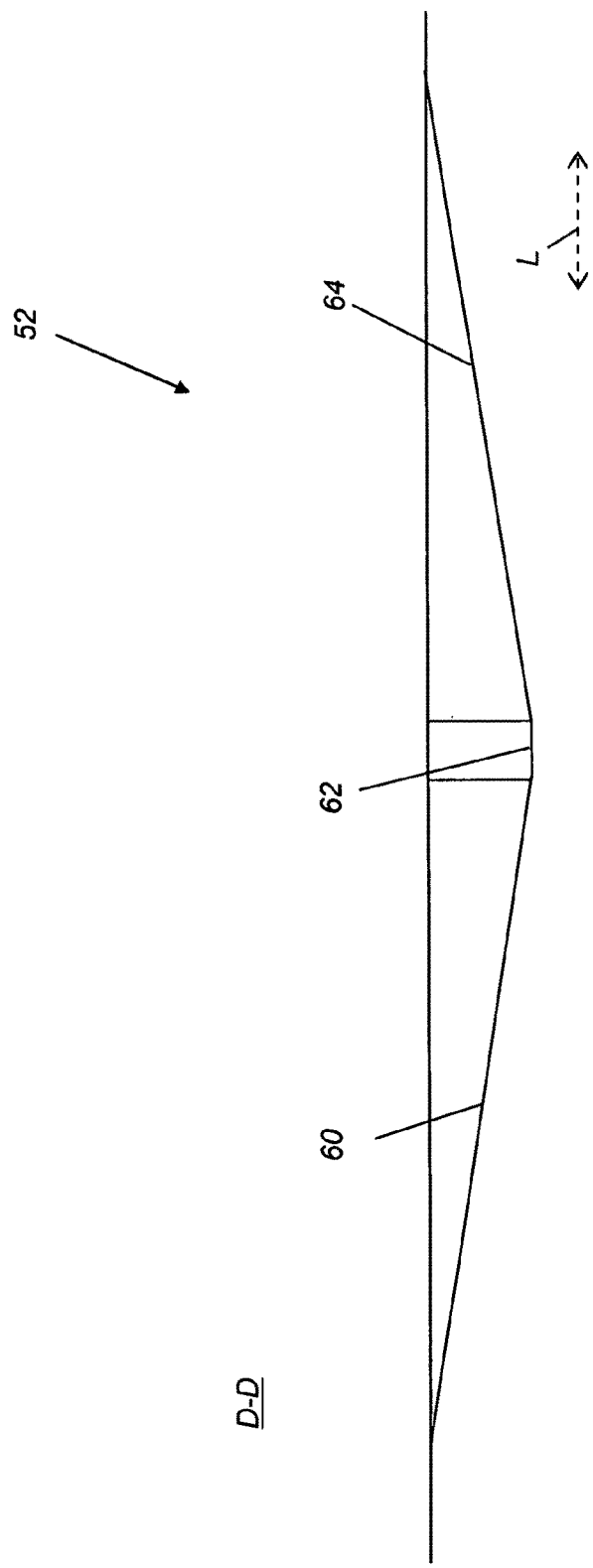

LIGHT GUIDING FILM HAVING LIGHT EXTRACTION FEATURES

FIELD OF THE INVENTION

The present invention relates to display illumination and more particularly relates to an illumination article for enhancing luminous intensity from a light source.

BACKGROUND OF THE INVENTION

Transmissive Liquid Crystal Display (LCD) panels offer a compact, lightweight alternative to other types of displays, but require some type of backlight illumination to provide the light for modulation. Backlight illumination for LCD and similar displays is typically provided by a light-providing surface that is positioned behind the LCD panel, relative to the viewer, and that redirects light from one or more light sources through the LCD panel. One exemplary type of light-providing surface is a Light Guiding Plate (LGP). The LGP acts as a waveguide, using Total Internal Reflection (TIR) for redirecting incident light that it receives from one or more sources that are positioned along its side edges. Some type of surface featuring is provided on the LGP in order to extract internally reflected light and redirect this light toward the display panel. One example of an illumination apparatus using an LGP is given in U.S. Pat. No. 5,999,685 entitled "LIGHT GUIDE PLATE AND SURFACE LIGHT SOURCE USING THE LIGHT GUIDE PLATE" to Goto et al.

Among drawbacks with solutions such as that proposed in the Goto et al. disclosure are the relative thickness and overall bulk of the conventional light guide plate. Conventional LGPs often exceed the thickness of the LCD panel itself. With the advent of smaller displays, such as those employed in mobile devices, and with the development of more compact solid-state light sources, such as Light-Emitting Diodes (LEDs), there is a need for an LGP solution that offers a thinner profile, weighs less, and is more flexible than existing designs. As displays continue to grow smaller in scale and with increased use of more flexible substrates, there is growing demand for a more flexible LGP, with thickness approaching 1 mm.

A number of solutions have been proposed for LGP devices that are better suited to smaller and more flexible displays. However, the solutions proposed thus far have inherent drawbacks that limit their utility or make them difficult to manufacture. For example, various types of light-extracting features formed in the LGP surface have been proposed. However, the geometrical profile of many of the proposed light-extracting features require manufacturing methods such as injection molding or hot compression molding. These fabrication methods may work well with thicker materials, but prove increasingly difficult and impractical as LGP thickness decreases. For example, a number of proposed solutions require surface light-extraction features that have 90-degree vertical walls. Sharp angles at this scale can be very difficult to fabricate, using any method, with known plastic materials at the needed size. Still others require features having a relatively high height:width aspect ratio, features difficult to fabricate for similar reasons. Although such structures may work well in theory and although their fabrication may be possible, the manufacturing problems they present make many of the proposed designs impractical for mass production. Little attention seems to have been paid to how an LGP having light-extraction features with sharply-angled sidewalls can be economically mass produced.

Thus, it is recognized that there is a need for light guiding surface solutions that allow the use of flexible materials, that can be produced with a relatively thin dimensional profile, and that are designed for high-volume manufacture.

SUMMARY OF THE INVENTION

In an embodiment of the present invention a light-guiding article is provided comprising: a film substrate that has at least one patterned surface comprising a plurality of discrete surface features and an incident edge that is substantially orthogonal to the at least one patterned surface, wherein each surface feature in the plurality of discrete surface features extends along a length direction that is substantially parallel to the incident edge; and wherein, taken in cross-section along the length direction, each surface feature has a positively sloped portion, a substantially flat portion, and a negatively sloped portion and wherein a first widthwise cross-section taken at a first position through the positively sloped portion has the same shape as a second widthwise cross-section taken at a second position through the negatively sloped portion.

In another embodiment of the present invention a light-guiding article is provided comprising: a film substrate that has at least one patterned surface comprising a plurality of discrete surface features and an incident edge that is substantially orthogonal to the at least one patterned surface, wherein each surface feature in the plurality of discrete surface features extends along a length direction that is substantially parallel to the incident edge; and wherein, taken in cross-section along the length direction, each surface feature has a positively sloped portion, a substantially flat portion, and a negatively sloped portion; and widthwise cross-sections within the same surface feature, taken orthogonal to the length direction, have the same apex curvature.

In another embodiment of the present invention a display apparatus is provided comprising: a) a spatial light modulator configured to respond to an input image signal for modulating incident illumination; b) a light-guiding article comprising: a film substrate that has at least one patterned surface comprising a plurality of discrete surface features and an incident edge that is substantially orthogonal to the at least one patterned surface, wherein each surface feature in the plurality of discrete surface features extends along a length direction that is substantially parallel to the incident edge; and wherein, taken in cross-section along the length direction, each surface feature has a positively sloped portion, a substantially flat portion, and a negatively sloped portion; and wherein a first widthwise cross-section taken through the positively sloped portion has the same shape as a second widthwise cross-section taken through the negatively sloped portion; and c) a light source disposed to direct light into the incident edge of the light-guiding article for redirection as illumination to the spatial light modulator.

BRIEF DESCRIPTION OF THE DRAWINGS

FIGS. 3A, 3B, 3C, and 3D show light behavior for incident light at features in the light-guiding film surface.

FIG. 14 is a cross-sectional view of a cavity formed in the roller surface.

DETAILED DESCRIPTION OF THE INVENTION

Figure 1:
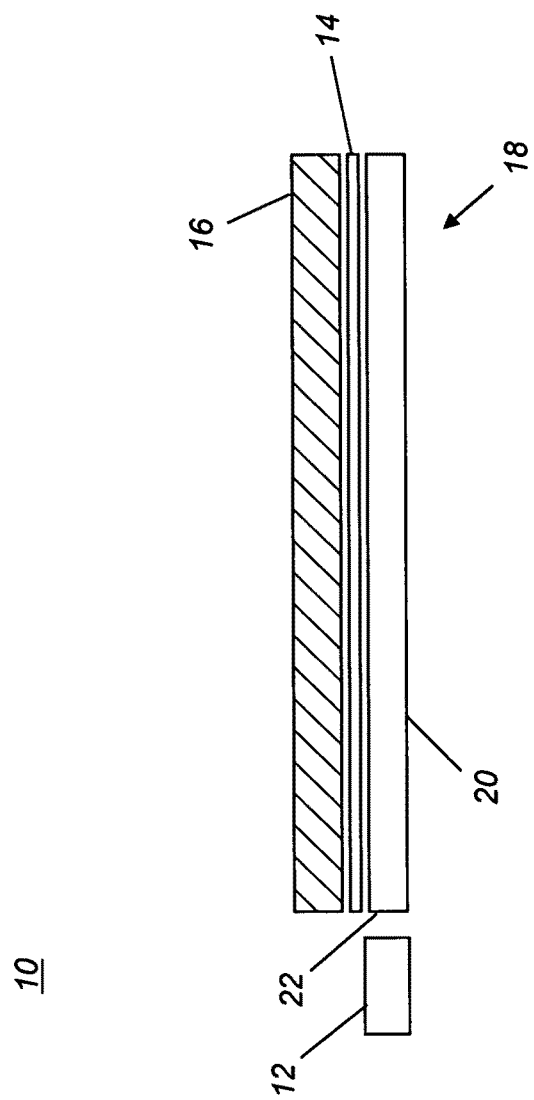
FIG. 1 shows a display apparatus using the light-guiding film of the present invention.

Referring to FIG. 1, there is shown, in cross-section, an embodiment of a display apparatus 10 with an illumination apparatus 18 using a light-guiding article, light-guiding film (LGF) 20, according to the present invention. A light source 12 directs illumination through an incident edge 22 of LGF 20. LGF 20 redirects this illumination outward, through one or more optional light-enhancement or light-redirecting films 14 and to a spatial light modulator, here an LCD display 16, that modulates the illumination.

Light source 12 can use any of a number of types of light-emitting elements. Conventional LGPs used for laptop computer and larger displays have used CCFLs (Cold-Cathode Fluorescent Lamps). LGF 20 of the present invention can use this thicker type of light source but is advantaged for use with thin-profile light sources such as a linear array of LEDs or other linear solid-state source.

Figure 2:
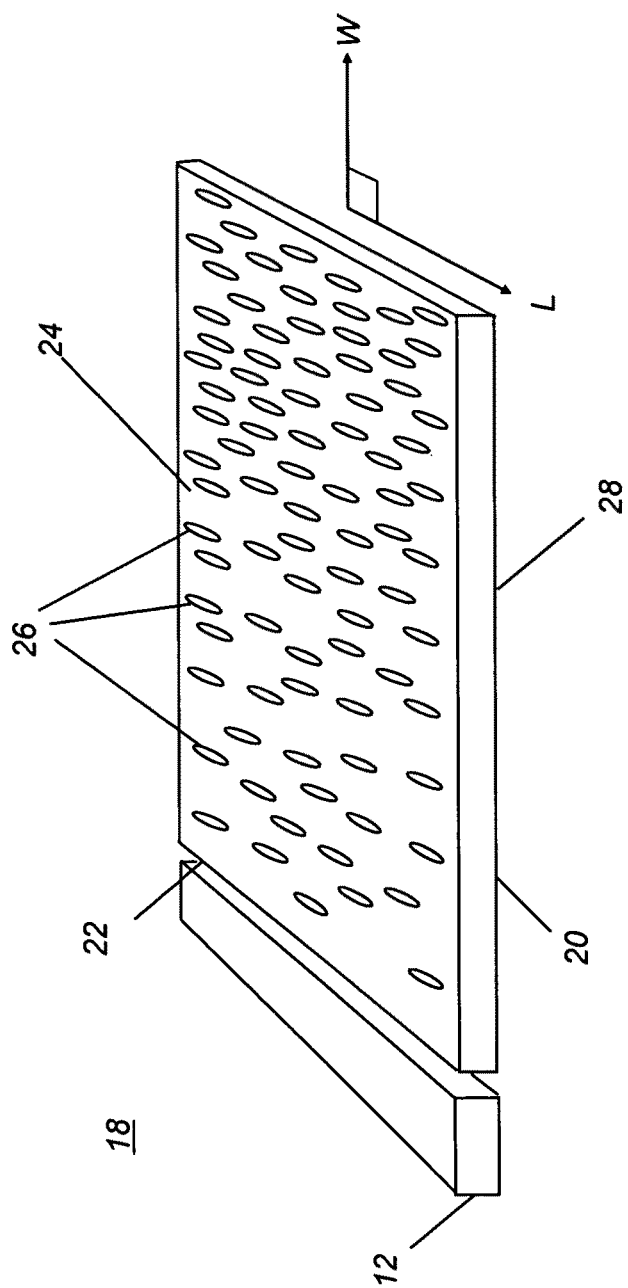
FIG. 2 shows a perspective view of the light-guiding film in one embodiment.

The perspective view of FIG. 2 shows aspects of LGF 20 and its light-exiting output surface 24 in illumination apparatus 18. As shown in FIG. 2, light source 12 directs illumination into incident edge 22 which is substantially orthogonal to output surface 24. Discrete light-extracting features 26 are formed on output surface 24, or, alternately, on a bottom surface 28, so that either or both output surface 24 and bottom surface 28 are patterned surfaces. As is seen in more detail in subsequent figures, light-extracting features 26 are dimensionally extended along a length direction L of LGF 20 and are narrower in a width direction W, orthogonal to length direction L. Light source 12 is generally arranged along length direction L. Light-extracting features 26 may be spatially distributed at equal intervals over surface 24 or 28; however, there can be advantages to embodiments in which the spatial distribution of light-extracting features 26 varies with distance from incident edge 22 in width direction W, as is shown in FIG. 2 and described subsequently.

Figure 3C:
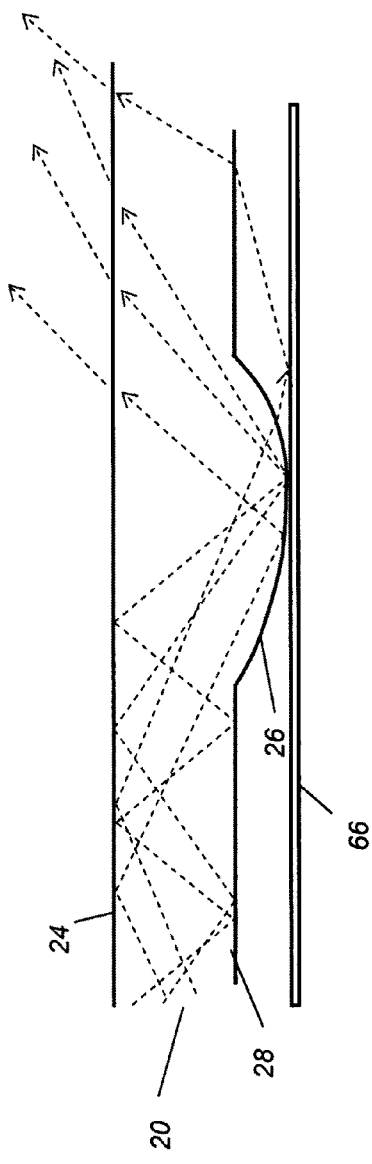

FIGS. 3A, 3B, 3C, and 3D show, in cross-section views, different arrangements of light-extracting features 26 on the patterned surface, either output surface 24 or bottom surface 28. Dashed lines in these figures indicate different exemplary light paths that illustrate the behavior of light-extracting features 26. Light is directed within LGF 20 by Total Internal Reflection (TIR), a principle familiar to those skilled in the light-guide art. The general function of light-extracting features 26, whether they protrude from or are formed into surface 24 or 28, is to frustrate TIR, causing this light to escape from LGF 20. FIGS. 3A and 3B show light behavior for two types of light-extracting features 26 formed on output surface 24, protruding from the surface or indented into the surface, respectively. In either case, internally reflected light is directed outward from output surface 24 when it impinges on the surface of light-extracting features 26.

Figure 3D:
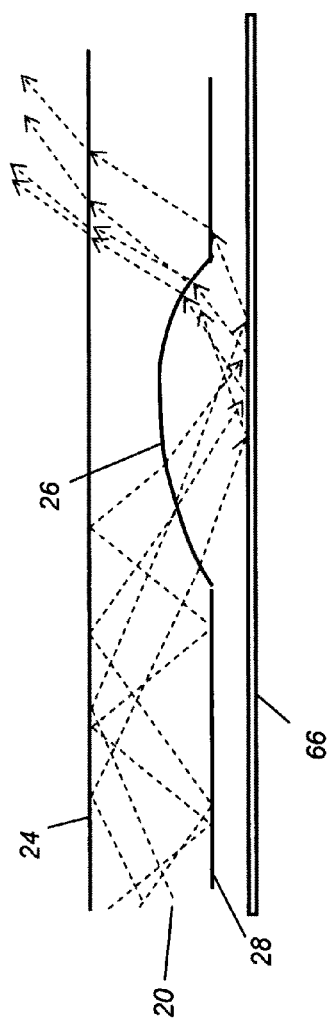

FIGS. 3C and 3D show alternate embodiments in which light-extracting features 26 are formed on bottom surface 28. A reflective surface 66 is provided as part of illumination apparatus 18 (FIGS. 1 and 2) with these embodiments for redirecting light that has been extracted using light extracting features 26. Reflective surface 66 redirects this light back through LGF 20 and out through output surface 24.

Figure 4:
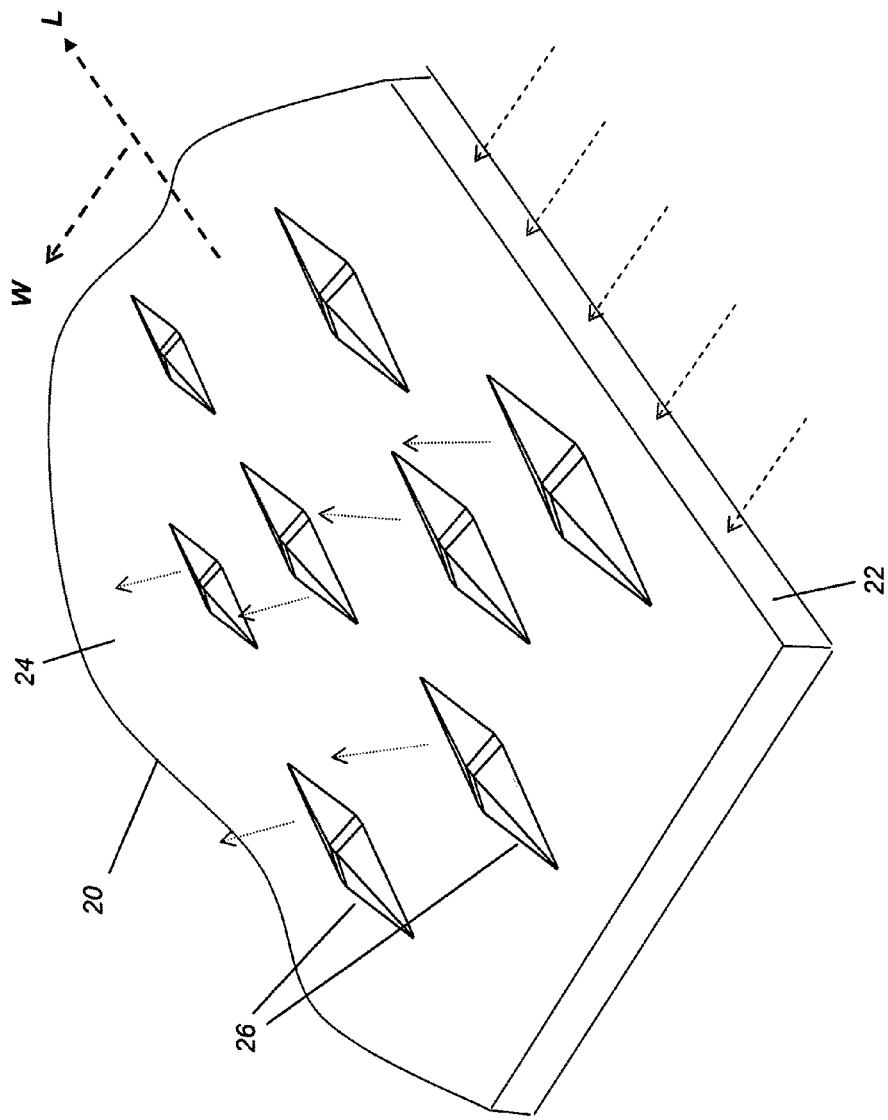
FIG. 4 is a perspective view showing a portion of the light-guiding film in one embodiment.

The perspective view of FIG. 4 shows a portion of LGF 20 having a number of light-extracting features 26 formed on top surface 24. Light-extracting features 26 operate as described with reference to FIGS. 3A-3D, extracting reflected light from within LGF 20 according to Snell's law.

It can be observed that light-extracting features 26 of the present invention differ from various types of light-extraction structures that have been used for light-guiding devices in other applications. Other light-guiding approaches have used diffraction effects or scattering from scattering particles, printed dots, or surface roughening, for example. Unlike structures that distribute light using a diffraction grating or randomized scattering, light-extracting features 26 can be said to operate upon light in largely a deterministic manner, providing a predictable optical path for illumination at a given angle within LGF 20. Embodiments using light extracting features 26 thus only provide a minor percentage of output light due to random effects or imperfections in shape and materials.

Figure 5A:
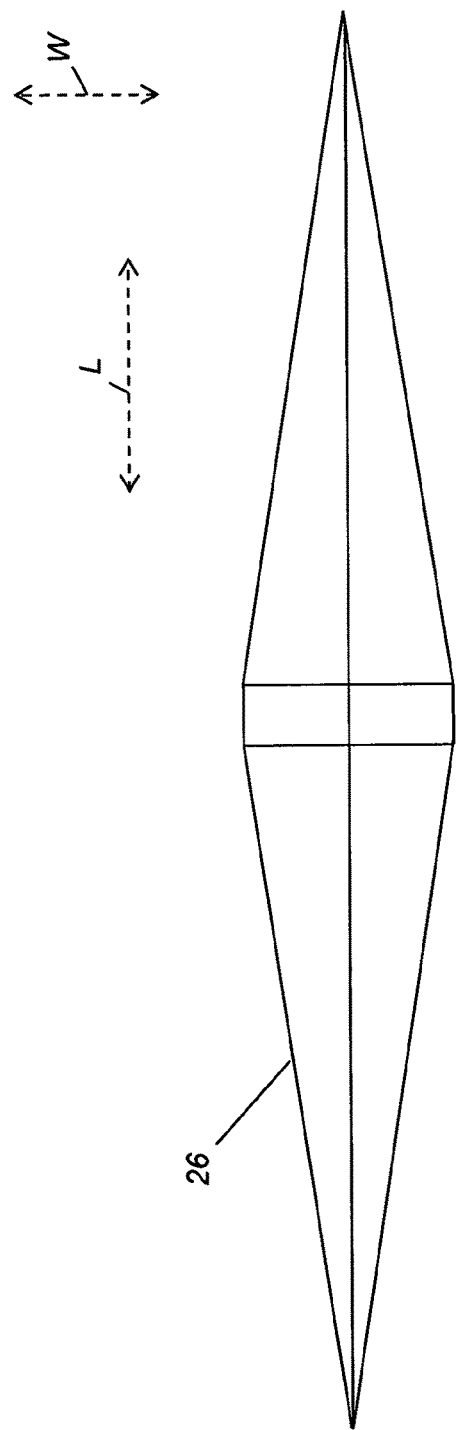
FIG. 5A is a top view of a feature on the light guiding film in one embodiment.
Figure 5B:
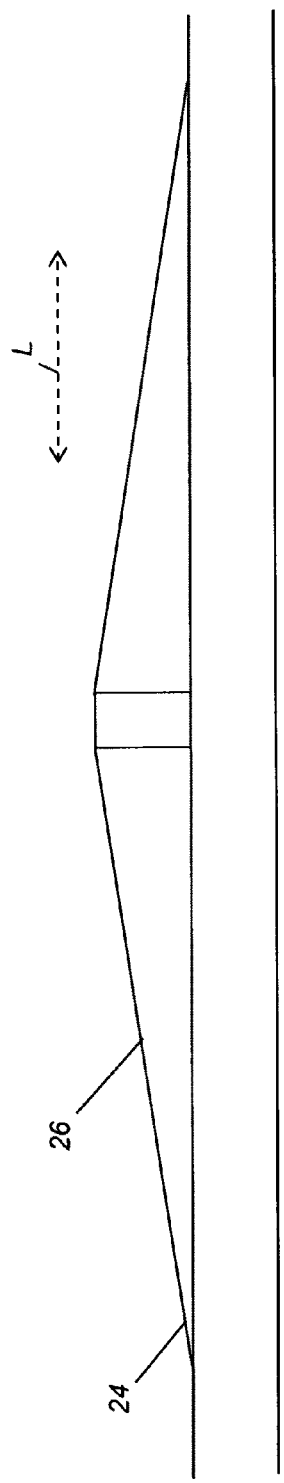
FIG. 5B is a side view of a feature on the light-guiding film of FIG. 4, protruding from the film surface.
Figure 5C:
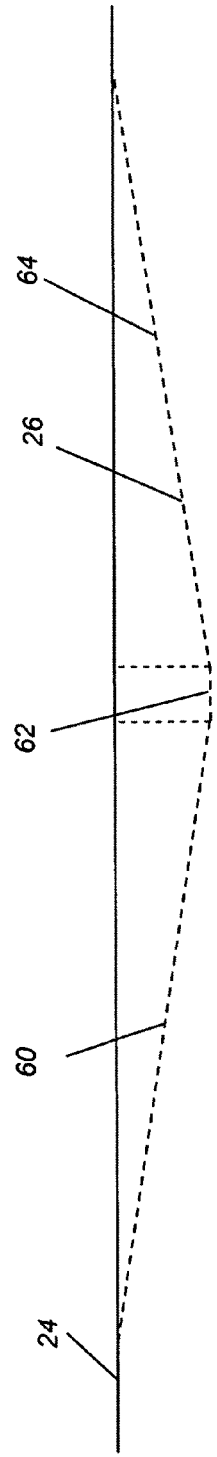
FIG. 5C is a side view of a feature on the light-guiding film of FIG. 4, a cavity formed into the film surface.

FIGS. 5A, 5B, and 5C show the overall geometry of feature 26 in various embodiments. FIG. 5A is a top view of feature 26. FIG. 5B is a side view of the same feature 26. FIG. 5C shows a side view for an embodiment in which feature 26 is formed into, rather than protruding from, surface 24. The shape in FIG. 5C can alternately be considered as the shape of the cavity that is used to mold feature 26 on the film surface of LGF 20, as is described in more detail subsequently.

With particular reference to FIG. 5C, it can be seen that there are three portions to this shape of feature 26 from its corresponding mold cavity: (i) a cutting-in region 60, (ii) a near flat region 62, and (iii) a cutting-out region 64. Considered in lengthwise cross-section, as shown in the view of FIG. 5C, cutting-in region 60 and cutting-out region 64 are oppositely sloped, one positively and the other negatively sloped, and both extend inward toward near-flat region 62, which essentially has zero slope. Each of regions 60, 62, and 64 has its characteristic lengthwise and cross-sectional shape based on how its corresponding mold element is tooled into and fabricated using patterned rollers, as described in more detail subsequently.

It should be observed that in the context of the present invention, the terms "positive slope" and "negative slope" are relative to each other and can be taken to refer to the shape of a mold cavity used to form feature 26. Considered in lengthwise cross-section, each feature 26, whether protruding from or indented into the surface, has two portions with relatively opposed slopes: a positively sloped and a negatively sloped portion.

Figure 6A:
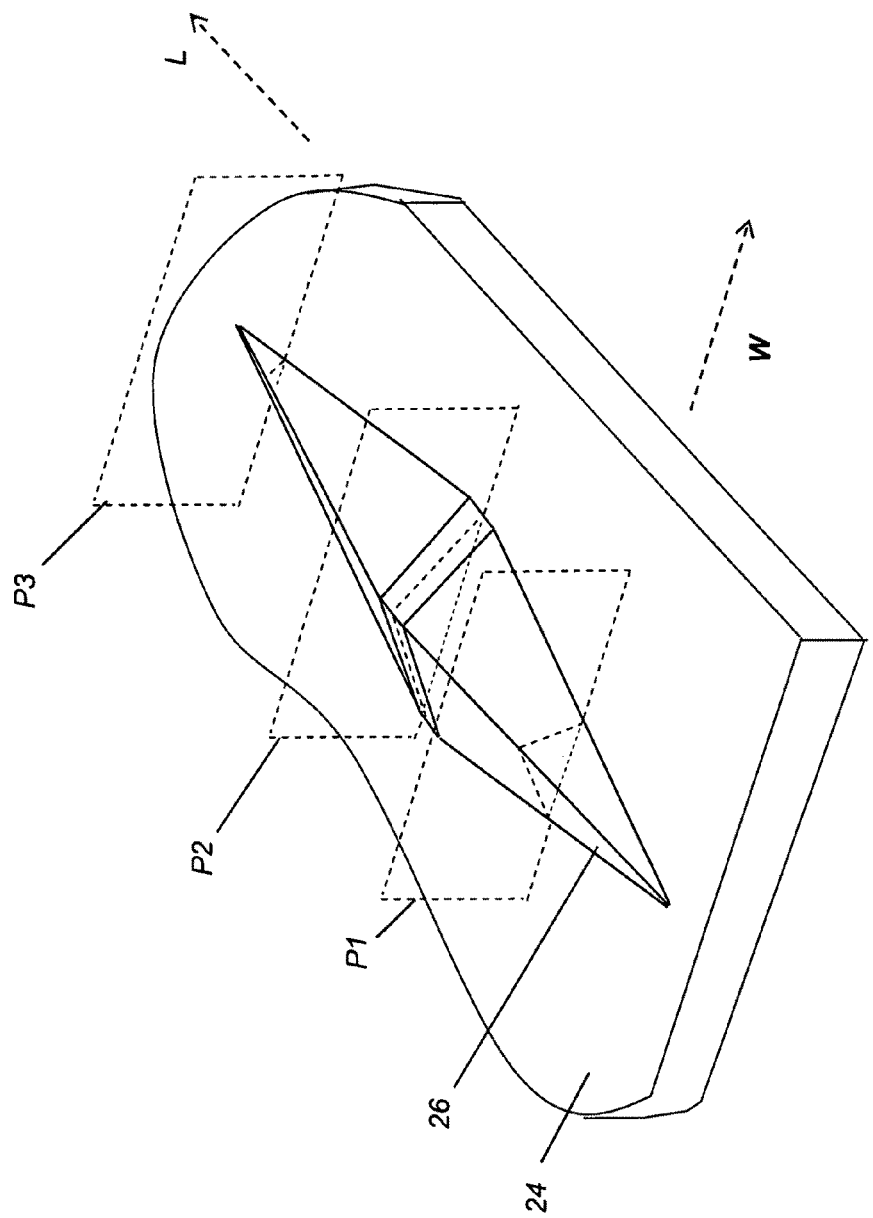
FIG. 6A is a magnified view of a typical protruding feature showing cross-sectional symmetry.
Figure 6B:
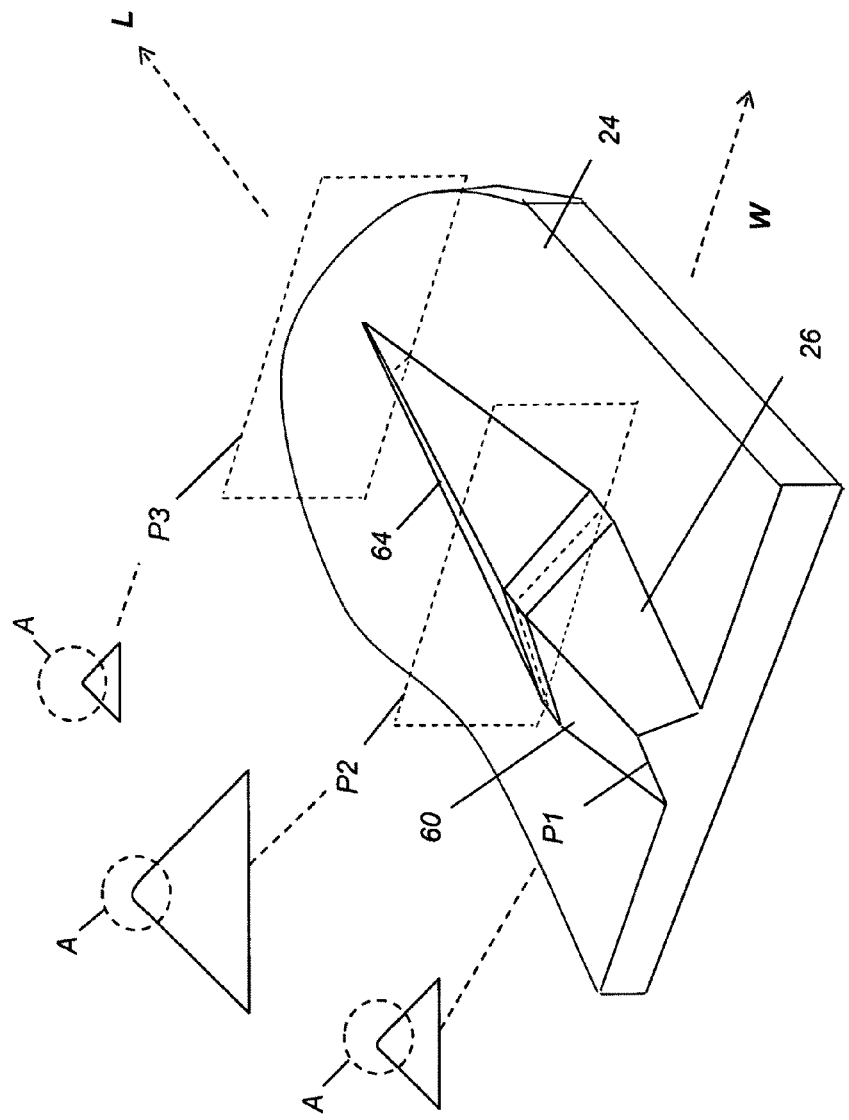
FIG. 6B is a cutaway view of the feature in FIG. 6A, showing cross-sections.

Because of the ways in which features 26 are formed, they can have the same characteristic cross-sectional shape throughout, a characteristic that is not shared with conventional light-guide extraction feature designs. The perspective views of FIGS. 6A and 6B show this cross-sectional symmetry in detail. FIGS. 6A and 6B show cross-sections through feature 26, taken along width direction W and obtained at various positions (shown here as positions P1, P2, and P3) with respect to length L. FIG. 6B shows a cutaway view of feature 26 and shows the basic shape of the cross-section taken at each position P1, P2, and P3 indicated. As the example of FIG. 6B shows, the cross-section at each position P1, P2, and P3 has substantially the same triangular shape, as "similar triangles", to within limitations imposed by tolerance error and materials. With respect to FIG. 5C, it can be seen that FIGS. 6A and 6B show a cross-section that is taken within each of the three portions of feature 26 shape noted earlier. That is: for portion (i), a cross-section through cutting-in region 60 is obtained at position P1; for portion (ii), a cross-section through near-flat region 62 is obtained at position P2; for portion (iii), a cross-section through cutting-out region 64 is obtained at position P3.

Figure 6C:
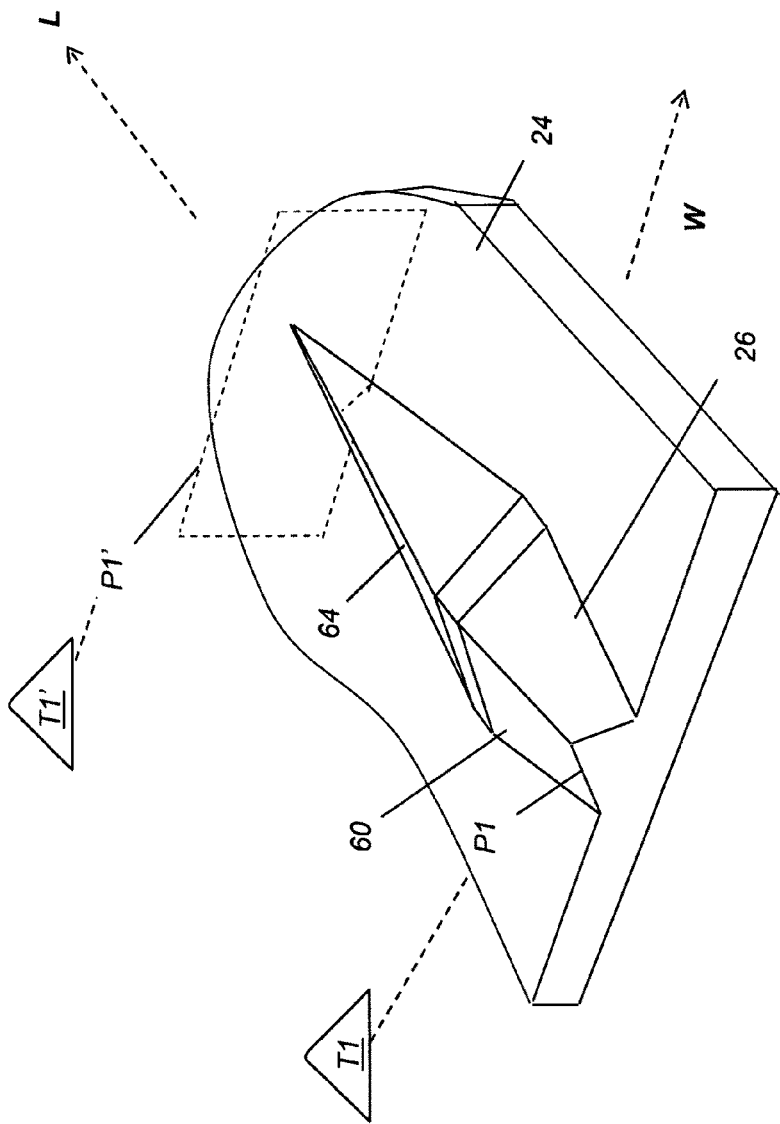
FIG. 6C is a perspective view of the feature in FIG. 6A showing two widthwise cross-sections having the same shape, one cross-section through a positively sloped portion, the other through a negatively sloped portion of the feature.

As shown in FIG. 6B, each cross-section within a feature 26 has the same apex curvature, outlined as A in these sample cross-sections. The apex curvature itself does not change from one cross-section to the next. With the geometry shown in FIG. 6B, it can be appreciated that a first widthwise cross-section taken at some position through positively sloped region 60 has substantially the same dimensions as a second widthwise cross-section taken through negatively sloped region 64 at some other position. The perspective view of FIG. 6C shows a specific instance where this relationship holds. Here, two widthwise triangular cross-sections are shown, one triangular cross-section T1 taken at position P1, the other triangular cross-section T1' taken at position P1'. Both triangular cross-sections T1 and T1' have the same shape, identical to within fabrication tolerances for the respective materials and dimensions. Cross-section T1 is taken through the positively sloped portion that corresponds to cutting-in region 60; identically shaped cross-section T1' is taken at some point through the negatively sloped portion of the feature that corresponds to cutting-out region 64. This cross-sectional symmetry arrangement, in which a widthwise cross-section taken at a first position along cutting-in region 60 dimensionally matches a widthwise cross-section taken at a second position along cutting-out region 64, applies for other embodiments of the present invention as well.

Figure 7A:
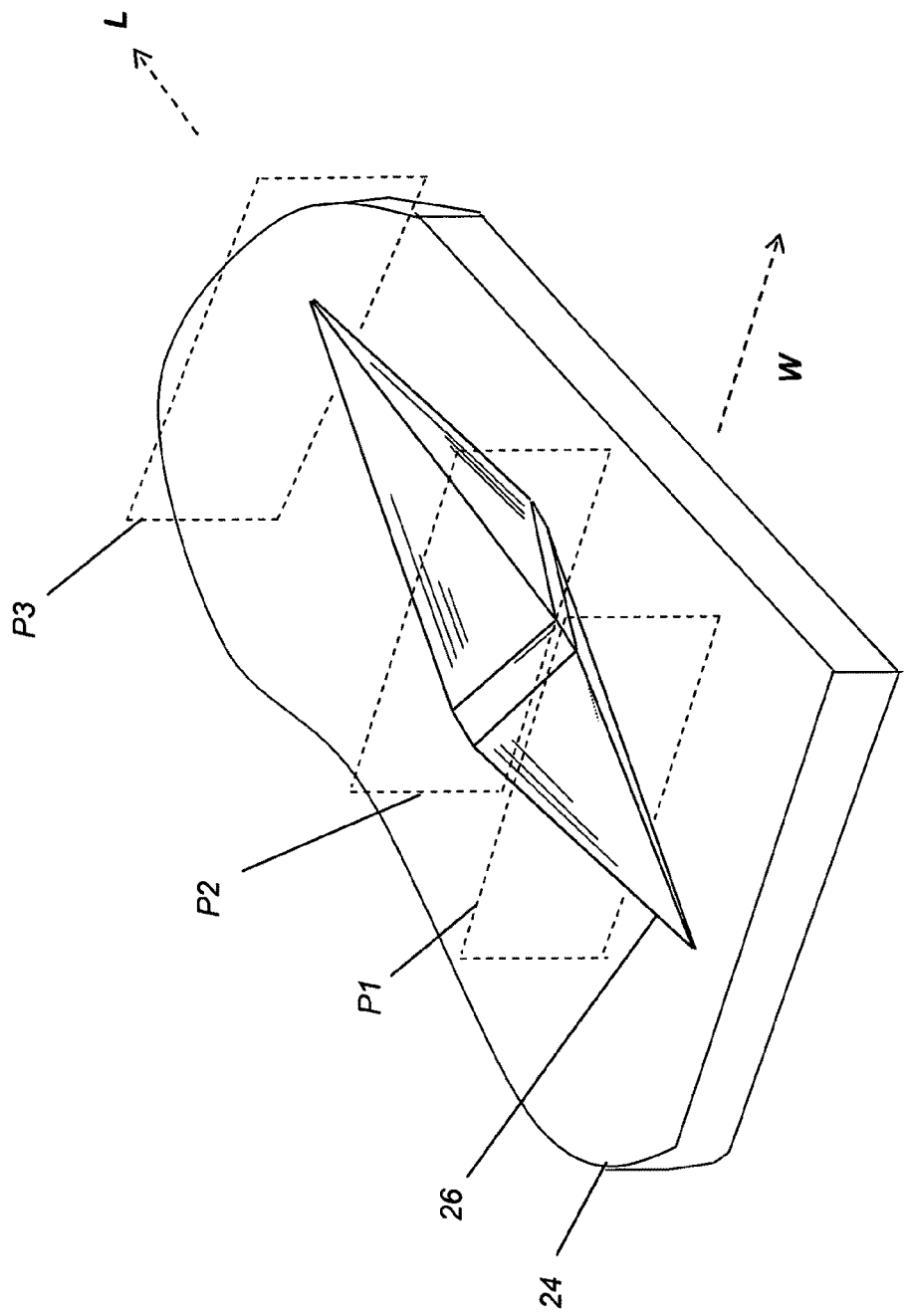
FIG. 7A is a magnified view of a typical indented feature showing cross-sectional symmetry.
Figure 7B:
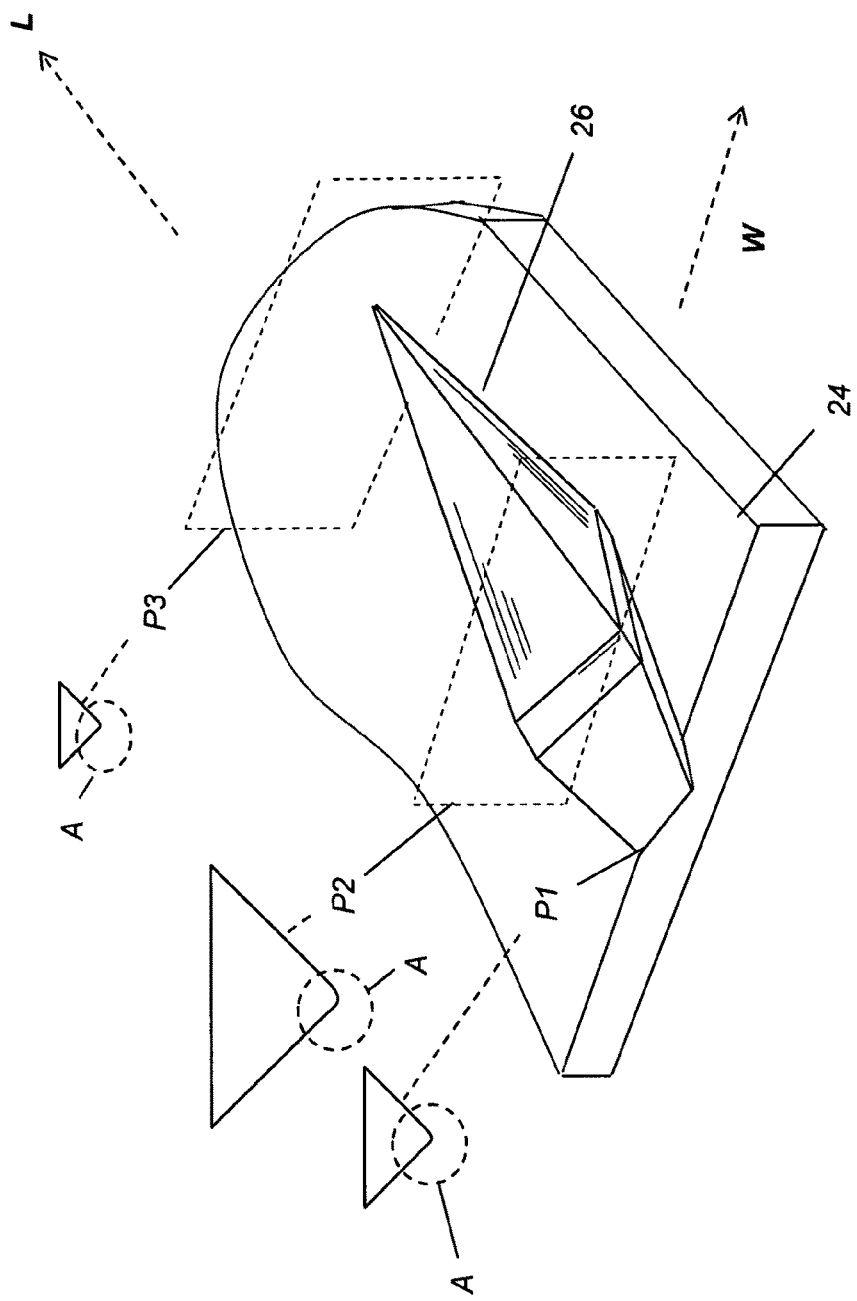
FIG. 7B is a cutaway view of the feature in FIG. 7A, showing cross-sections.

The perspective views of FIGS. 7A and 7B also show cross-sections, here through feature 26 that is indented into surface 24, rather than protruding as in the embodiment of FIGS. 6A and 6B. Again, within feature 26, the cross-section at each position P1, P2, and P3 has the same apex curvature A and, in this example, the same shape.

Figure 8A:
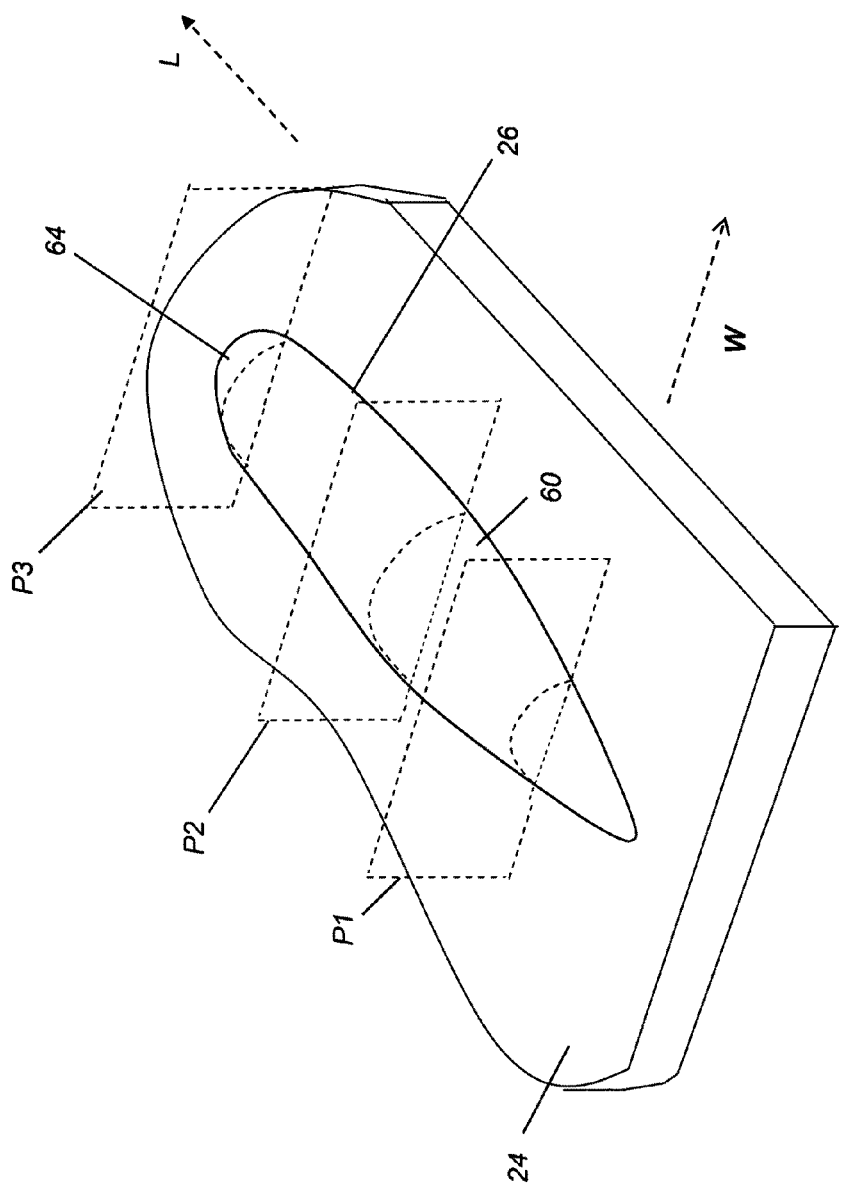
FIG. 8A is a magnified view of an alternate protruding feature showing cross-sectional symmetry.
Figure 8B:
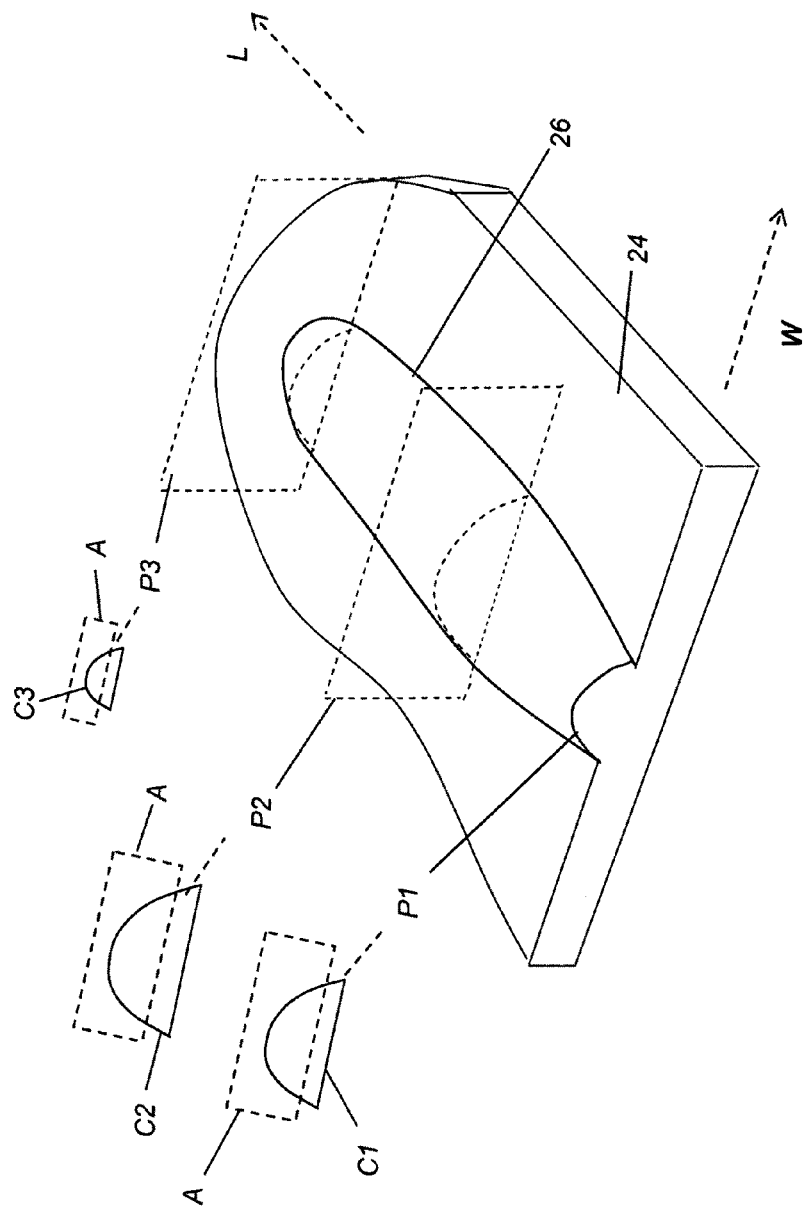
FIG. 8B is a cutaway view of the feature in FIG. 8A, showing cross-sections.

In a similar way, FIGS. 8A and 8B show an exemplary feature 26 that has a curved cross-sectional profile. Here, the apex curvature A of the cross-sections C1, C2, and C3, taken at positions P1, P2, and P3 respectively, is the same for any height of feature 26. As was described earlier with reference to feature 26 in FIGS. 6A-6C, the dimensional equivalence of two widthwise cross sections, one taken at some point through cutting-in region 60, the other taken at some point through cutting-out region 64, also applies for feature 26 in FIGS. 8A and 8B.

Figure 8C:
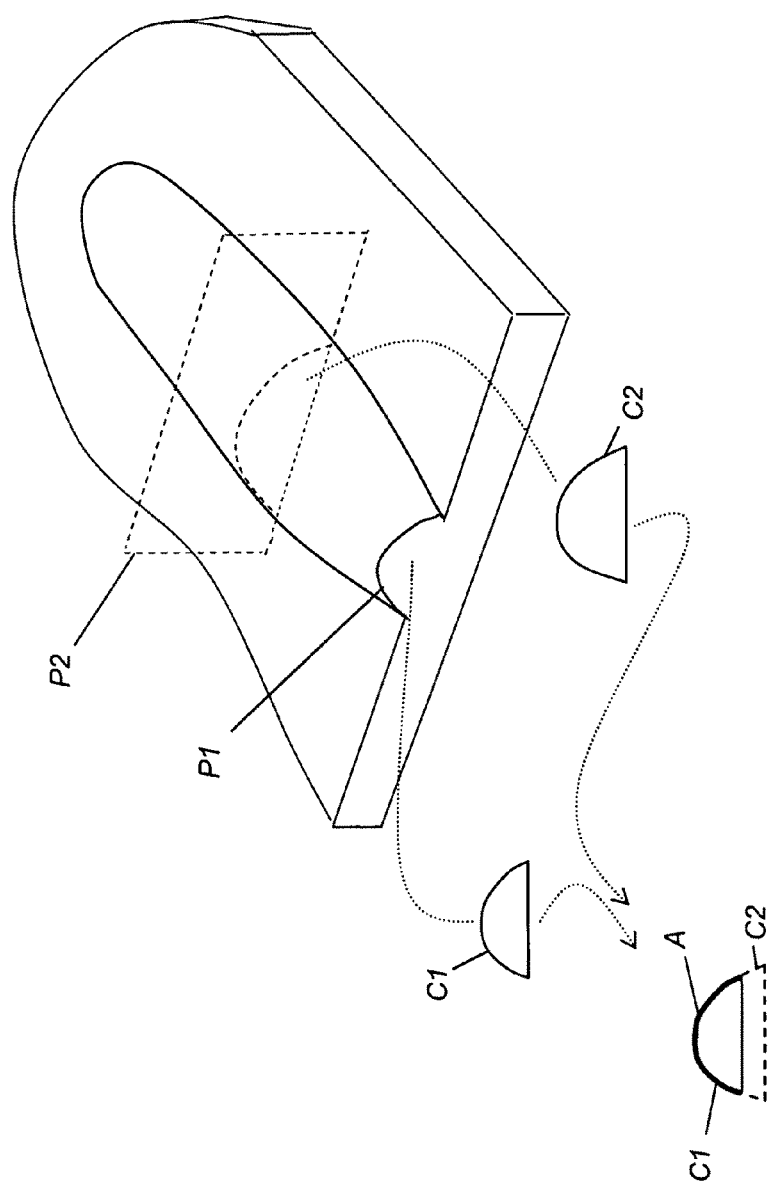
FIG. 8C shows the intersection of overlaid cross-sections along the apex.

It is significant to note that, for embodiments of the present invention, the apex curvature of feature 26 itself does not change from one cross-section to the next, even though the height (or depth) of feature 26 may differ between two positions. This means that, when the dimensional outlines for any two cross-sections of the same feature 26 are overlaid, one onto another, their common intersection includes the apex. This is shown for two cross-sections C1 and C2 in the example of FIG. 8C. The intersection of cross-sectional outlines for C1 and C2, as shown in bold, includes apex A. This relationship occurs because of the way feature 26 is fabricated, as described subsequently.

Figure 8D:
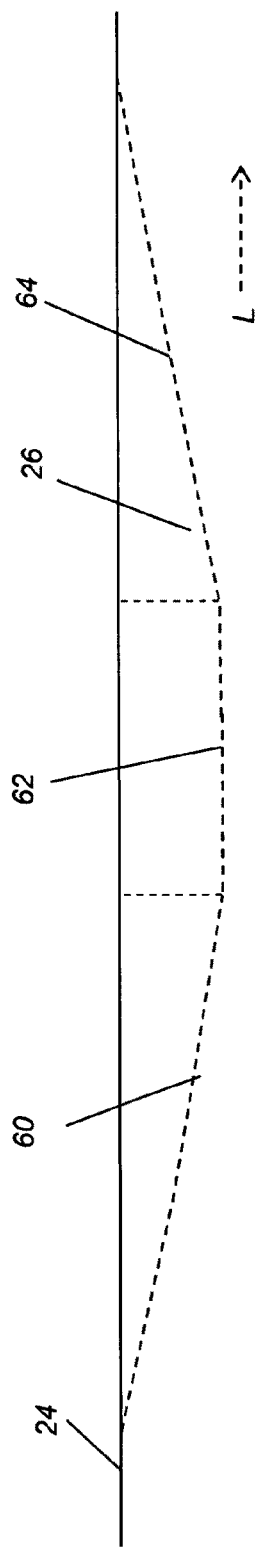
FIG. 8D shows a mold cavity that is used for the features in FIGS. 8A and 8B.

The cross-section view of FIG. 8D shows the design of a mold cavity that could be used for molding feature 26 having curved sides and shows how the same tooled-shape and region arrangement as shown for the anatomy of features 26 in FIG. 6A-7B applies. That is, the mold for each feature 26 is shaped by forming (i) negatively sloped cutting-in region 60, (ii) near flat region 62, and (iii) positively sloped cutting-out region 64. The relative proportions for each of these regions can be varied, as can the slope values for cutting-in and cutting-out regions 60 and 64. An indented version of feature 26, having the shape that is shown protruding in FIG. 8A, could also be formed. The cross-section that is taken through feature 26 is again related to a tool shape, as described subsequently in more detail.

In summary, it can be observed that for any of features 26, at least the following characteristics apply:
  (a) The surface feature extends dimensionally in a length direction. This direction is generally parallel to incident edge 22 and is orthogonal to the direction of light that is incident to LGF 20.
  (b) At any position within each surface feature 26, cross-sections taken orthogonally to the length direction share the same apex curvature, as described with reference to FIG. 8C.
  (c) For a widthwise cross-section taken at any position within cutting-in region 60, there is a corresponding widthwise cross-section taken at some position within cutting-out region 64 that has the same shape and dimensions.
  (d) Each feature 26 is shaped with a cutting-in region 60, a near-flat region 62, and a cutting-out region 64. Cutting-in region 60 and cutting-out region 64 are oppositely sloped.
  (e) Feature 26 can protrude from top or bottom surfaces of LGF 20 or can be indented into either surface.

Fabrication of Features 26

An advantage of light-guiding film 20 of the present invention is its design for fabrication using roll-to-roll processes, such as extrusion roll molding, roller molding using UV (ultraviolet) radiation curing, and similar molding techniques that employ one or more patterned rollers. In extrusion roll molding, a molten thermoplastic material is extruded, typically onto a base or carrier material, using one or more patterned rollers. Passing between a roller nip, the material is thereby formed into a film. The patterned roller or rollers impress a pattern onto the extruded material as it passes through the roller nip.

Figure 9:
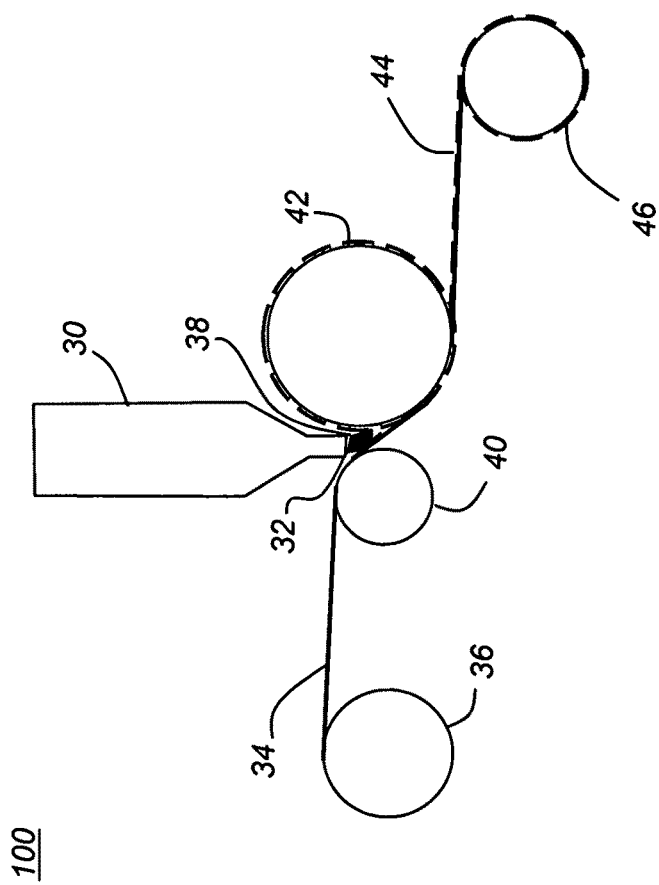
FIG. 9 is a schematic view of light-guiding film fabrication using a carrier.

The schematic view of FIG. 9 shows an extrusion roll molding apparatus 100 that can be used for fabricating light-guiding film 20 as a film. In this embodiment, an extruder 30 provides an uncured thermoplastic material 32, such as a polymer, onto a base 34, fed from a supply 36. Base 34 can be formed from the same material that is used for thermoplastic material 32 or can be formed from other sheet materials such as papers, films, or fabrics, for example. Molten thermoplastic material 32 and base 34 pass into a nip area 38 between a support 40, such as a pressure roller, and a patterned roller 42. As thermoplastic material 32 passes through nip area 38, support 40 and patterned roller 42 press the thermoplastic material 32 onto base 34, forming a substrate film 44, and the pattern that is on the roller is impressed into the resulting film 44. The impressed pattern is a negative of the surface of patterned roller 42. Thermoplastic material 32 is then cooled below its melting temperature, or otherwise cured, and the substrate film 44 is then wound onto a substrate take up roll 46 for further processing.

Figure 10:
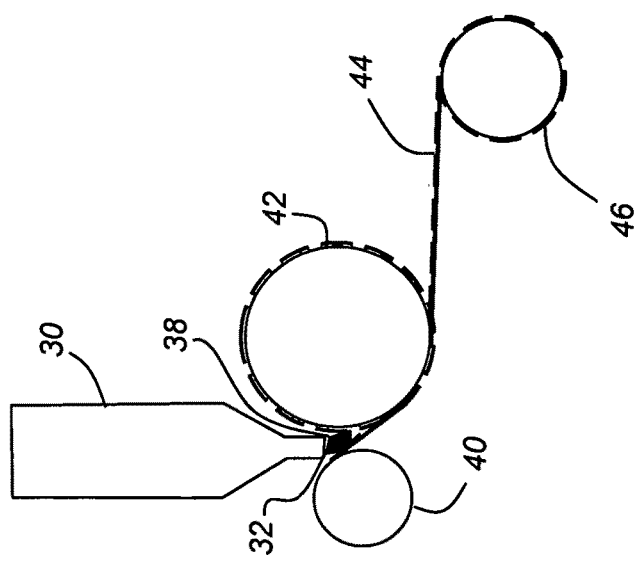
FIG. 10 is a schematic view of light-guiding film fabrication without use of a carrier.

The alternate extrusion roll molding embodiment of FIG. 10 forms film 44 by extruding the uncured thermoplastic material 32 without using a base or carrier material. Extruder 30 melts thermoplastic material 32 and supplies it to nip area 38 between support 40 and patterned roller 42. This forms film 44 as it cools, with the pattern that is on the roller surface impressed into the surface of film 44. The patterned and cooled film 44 is then wound onto a substrate take up roll 46 for further processing.

Figure 11:
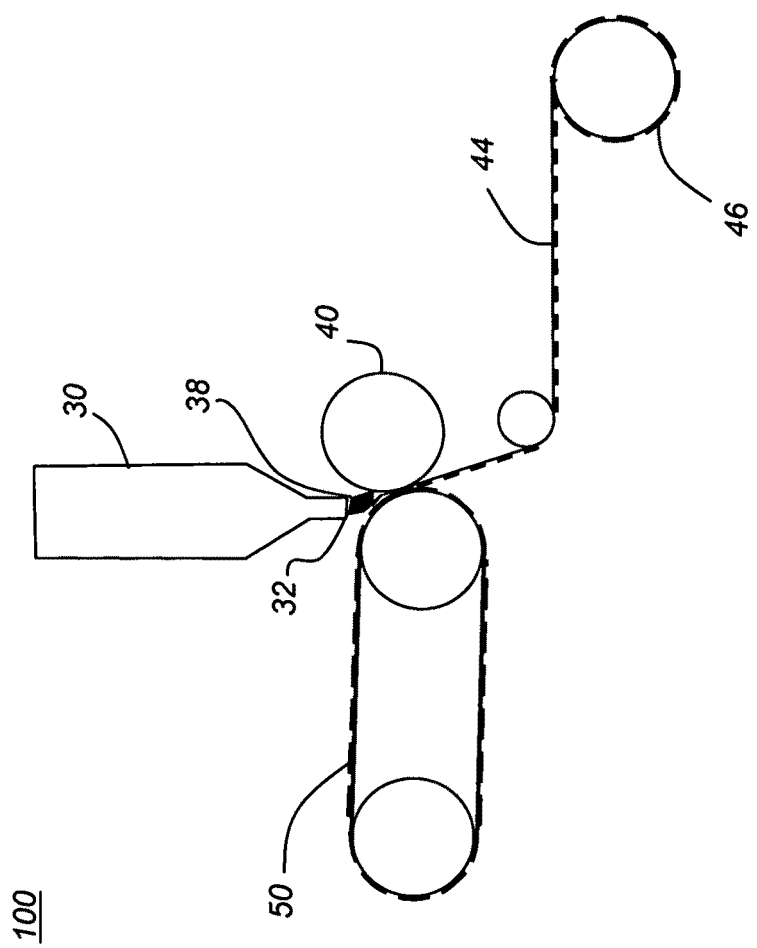
FIG. 11 is a schematic view of light-guiding film fabrication using a patterned belt.

FIG. 11 shows a schematic diagram of an alternate type of molding apparatus 100 that uses a patterned belt 50. Patterned belt 50 is itself formed using patterned roll fabrication as described with reference to FIGS. 9 and 10. In terms of its patterned structure, then, patterned belt 50 bears the imprint of a master patterned roller 42, serving as what is conventionally termed the "female" molding element. To form film 44, uncured thermoplastic material 32 is fed to nip area 38 between patterned belt 50 and support 40. With this arrangement, the surface pattern that is formed on film 44 is the same pattern as that of the patterned roller 42 surface. The indented surface patterns described earlier with reference to FIGS. 7A and 7B, for example, could be formed using patterned belt 50 or a similar molding element.

Figure 12:
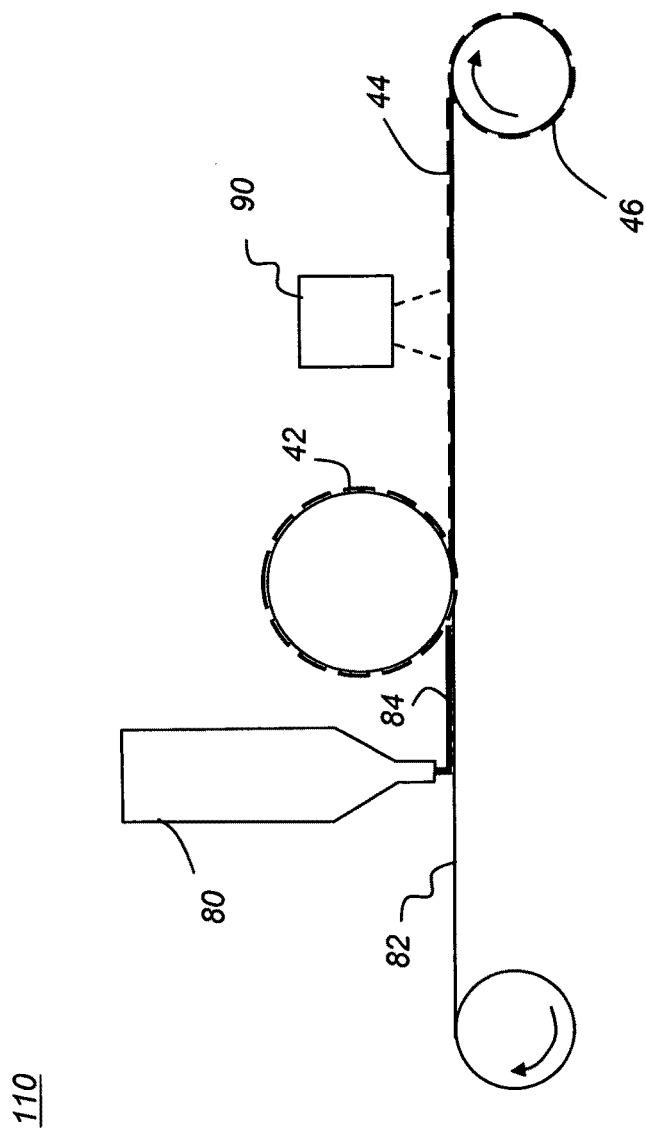
FIG. 12 shows, in schematic form, a fabrication apparatus using UV curing for manufacture of a light-guiding film.

FIG. 12 shows, in schematic form, a fabrication apparatus 110 using UV curing for manufacture of LGF 20. A coater 80 applies a layer of uncured material 84 to a carrier 82 or other support. Patterning can then be performed by impressing the uncured material using patterned roller 42. Following this, UV radiation 90 is used to promote curing of the applied layer so that it hardens with its impressed pattern, forming film 44 that is then wound onto roll 46. Film 44 may include or may discard the carrier 82 portion.

For the FIG. 9 through FIG. 12 embodiments, the shape and arrangement of features 26, shown in the examples of FIGS. 2 through 8D, are defined by the pattern that is formed on patterned roller 42. Embodiments of the present invention generate this pattern by using a stylus to form an arrangement of shaped cavities into the surface of a roller. The particular methods used to form these cavities offer advantages for high-volume film 44 fabrication.

Figure 13:
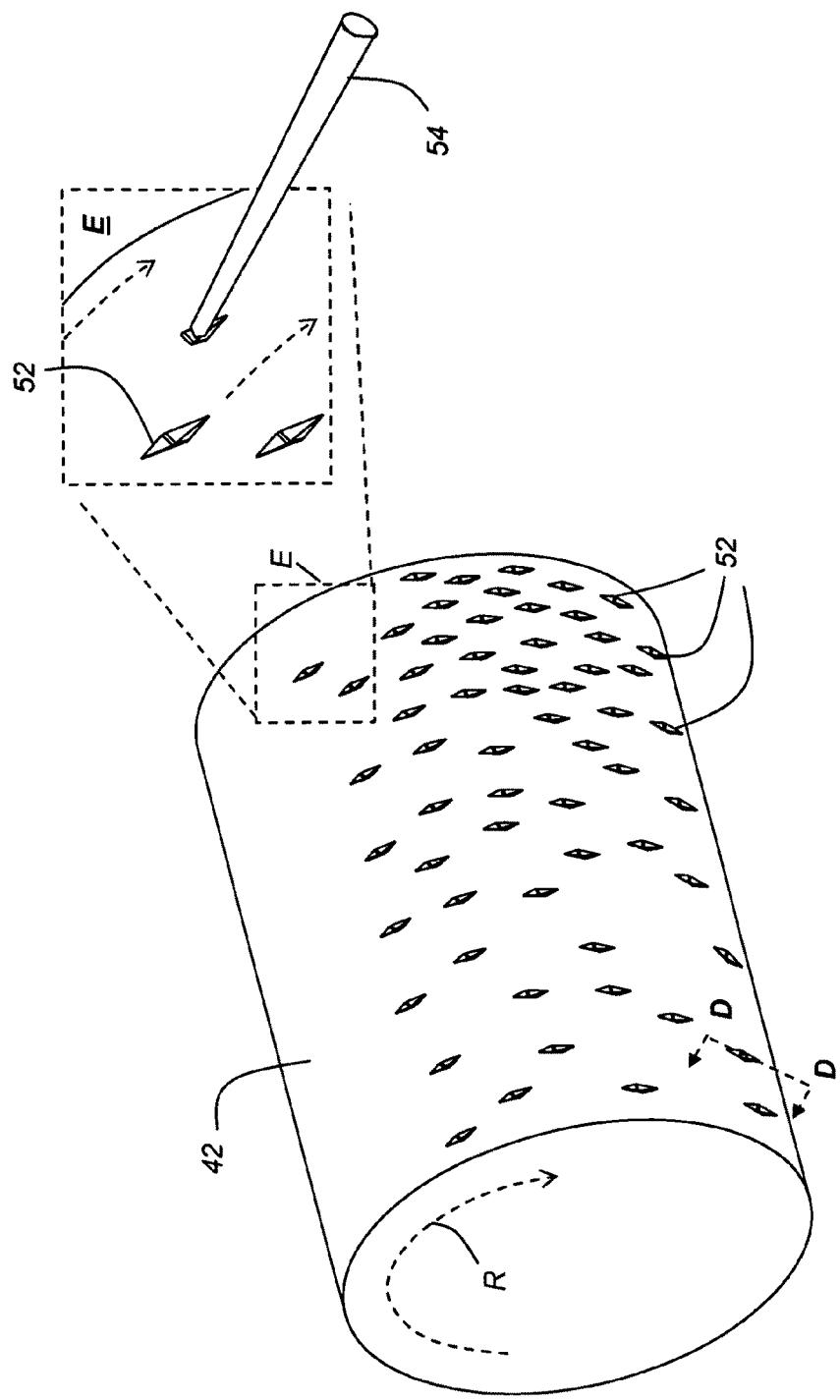
FIG. 13 is a perspective view showing preparation of a patterned roller in one embodiment.

The schematic diagram of FIG. 13 shows how a pattern is formed onto the surface of a roller for fabricating LGF 20 in one embodiment. Cavities 52 are formed into the roller surface by scoring the surface at a number of discrete positions, directing a stylus 54 such as a diamond tool into the roller surface. To facilitate this process, relative rotational movement is provided between the stylus 54 position and the roller surface, as shown by rotational arrow R.

The cross-sectional side view of FIG. 14 is taken lengthwise through one cavity 52 from the roller surface at D-D shown in FIG. 13. Referring momentarily back to FIGS. 5C and 8D, it can be seen that cavity 52 has a cutting-in region 60, near flat region 62, and cutting-out region 64 similar to that described with reference to an indented feature 26. Cutting-in region 60 is formed as stylus 54 initially pierces the roller 42 surface and is driven further into the surface while rotation takes place. Near-flat region 62 results as stylus 54 is held momentarily in position before it reverses direction to begin moving away from the roller 42 surface. Cutting-out region 64 is the result of gradual withdrawal of stylus 54. Slopes and depths of cavities 52 are not limited to those shown in the examples given herein and could be varied within the same patterned roller 42.

Because cavity 52 is cut from the roller surface in this manner, embodiments of the present invention have cavities 52 that are used to mold features 26 that have the same apex curvature and can have the same cross-sectional shape, as was described earlier with reference to FIGS. 6A through 8D. Cross-sectional shape for feature 26 is the same as the shape of its corresponding stylus 54. This process also gives features 26 their distinctive aspect ratio: extended along the length L direction that corresponds to the vector of rotational motion of patterned roller 42 (or, alternately, of stylus 54 about patterned roller 42) and generally narrow in width dimension W.

The fabrication method of the present invention thus uses relative rotation of the roller and periodic stylus insertion and depth in order to obtain the pattern of cavities 52 on patterned roller 42 that, in turn, become features 26 when molded into the film directly as shown in FIGS. 9, 10, and 12, or when molded into patterned belt 50 as shown in FIG. 11.

Light guiding film 20 of the present invention can be patterned on one or both surfaces in various embodiments. For double-sided patterning, a second patterned roller and other supporting components would be added to the basic process flow shown in FIGS. 9, 10, 11, and 12.

A number of different configurations are possible for patterned roller 42. In one embodiment, patterned roller 42 has a metallic surface, such as chrome, copper or stainless steel. Other materials that can be worked with a diamond tool or other stylus and that are compatible with extrusion roll molding could be used, including some plastics. A metallic sleeve or other outer structure could be used.

Figure 15C:
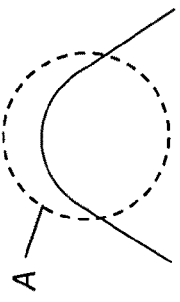
FIGS. 15A, 15B, 15C, and 15D show various stylus embodiments for scoring the roller surface.
Figure 15D:
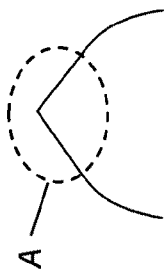
Figure 15A:
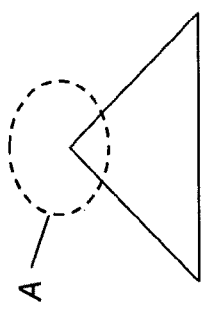
Figure 15B:
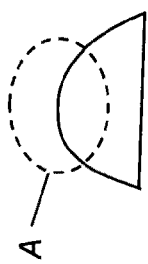

Stylus 54 can be of any of a number of materials, based on its suitability for forming cavities 52 in the overall manner described. The use of a diamond stylus is particularly advantaged for accurately forming features 26 of a small size. Stylus shapes can vary over a range. FIGS. 15A through 15D show some of the possible shape categories for stylus shape. FIG. 15A shows a substantially linear shape wherein the apex curvature approximates a sharp angle. FIGS. 15B and 15C show more arcuate shapes. FIG. 15D shows a stylus having both linear and arcuate segments and a sharper apex curvature. Features formed on the surface of light-guiding film 20 take the shape of the stylus tip that is selected. Each feature 26 that is formed with the same stylus 54 has the same apex curvature.

Tool shape geometries can have straight or curved sections and can be linear, triangular, trapezoidal, spherical, hyperbolic, or conic, for example. Where tool shape is curved, cross-sectional segments of features 26 will share the same curvature.

Distribution and Size of Light-Extracting Features 26

As noted earlier, there may be advantages to embodiments of LGF 20 in which features 26 have different density distributions per unit area. For example, there may be fewer features 26 per unit area for that portion of light-guiding film 20 that is nearest the light source. Features 26 can also be varied in relative size as well as distribution, by controlling the depth of the cavities made when scoring patterned roller 42. More than one stylus 54 can be used to score patterned roller 42.

Figure 16:
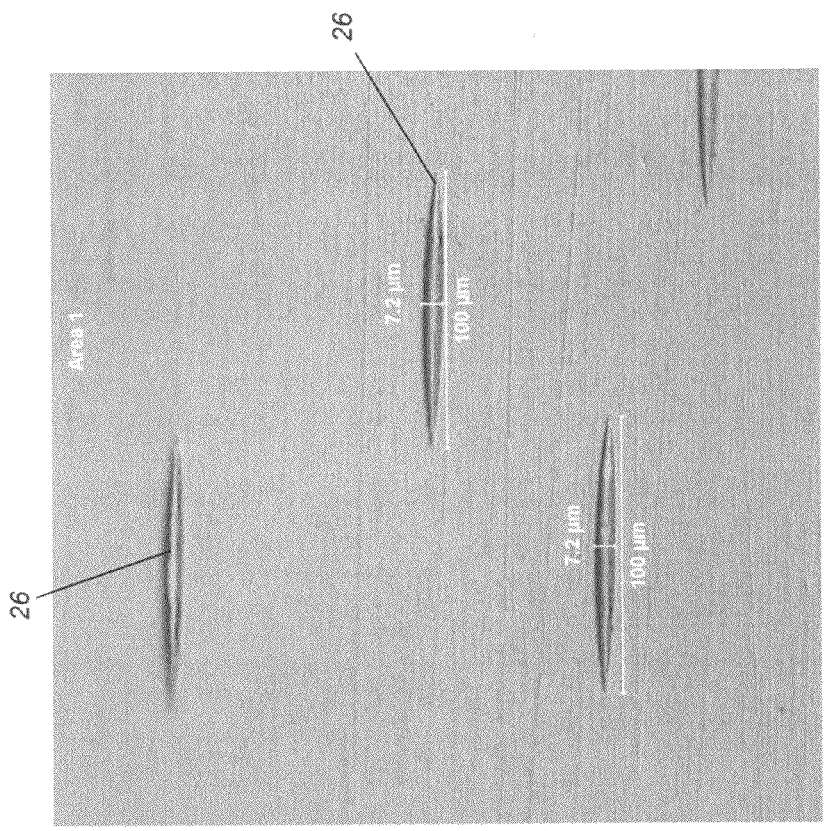
FIGS. 16 and 17 show close-up views of different embodiments of light-guiding film.
Figure 17:
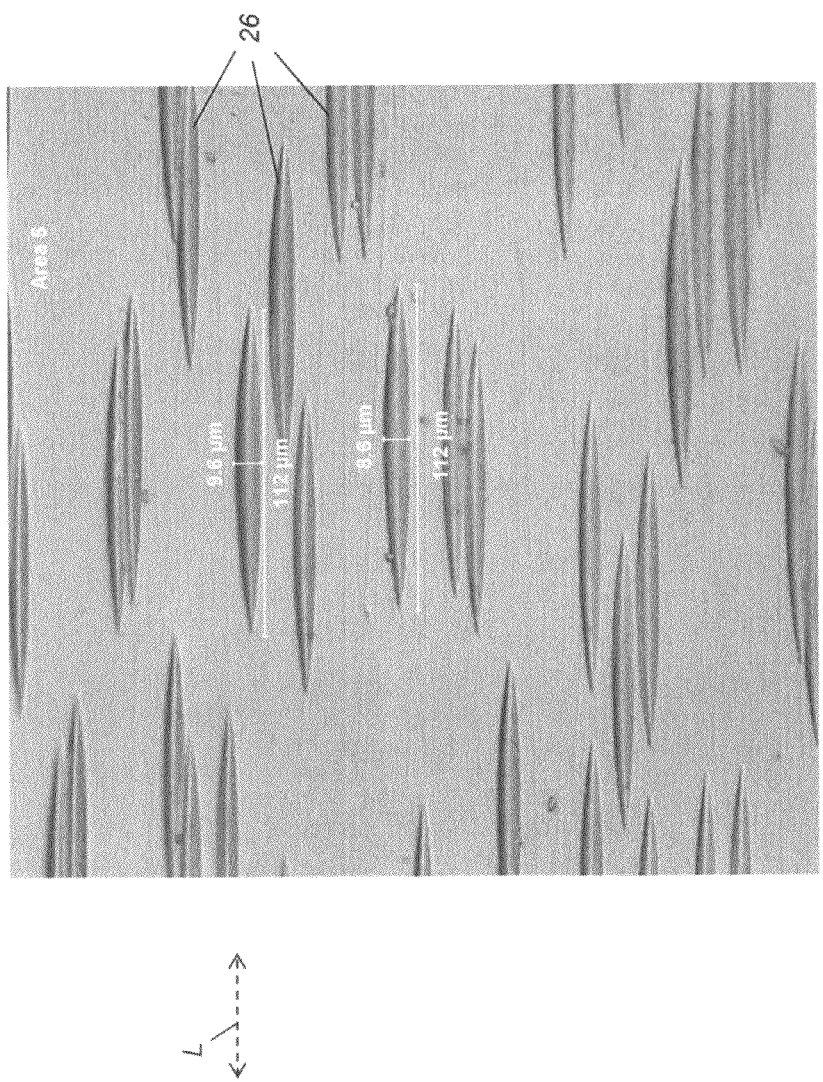

FIGS. 16 and 17 show plan views of two different embodiments of LGF 20 formed using a patterned roller. The embodiment in FIG. 16 has somewhat regular spacing between features 26; the FIG. 17 embodiment, by comparison, has more random spacing. By way of example, nominal width and length of features 26 in FIG. 16 is 7.2 µm×100 µm. For the FIG. 17 embodiment, nominal dimensions for the largest features 26 are 8.6 µm×112 µm; however, there are also smaller features 26 with LGF 20 in this example. Size and distribution considerations include factors such as the final use of the light-guiding article and dimensional attributes of the backlit LC device with which the article is used. Another consideration for distribution of features 26 relates to minimizing visible frequencies and minimizing possible frequency beat patterns when LGF 20 is used in combination with LCD or other light modulator components.

Materials Used

LGF 20 may be formed from any of various types of transparent materials, including, but not limited to polycarbonate, polyethylene terephthalate (PET), polyethylene naphthalate (PEN), or polymethyl methacrylate (PMMA).

Features formed on the patterned surface of the light-guiding film help to provide illumination for LCD and other types of backlit displays, particularly for smaller displays and portable devices. Embodiments of the present invention provide a light-guiding film that can be fabricated at thickness of 1 mm or less. This makes the LGF of the present invention particularly advantageous for use with LED or laser arrays and other linear solid state light arrays.

PARTS LIST

10. Display apparatus
12. Light source
14. Film
16. LCD display
18. Illumination apparatus
20. Light-guiding film (LGF)
22. Incident edge
24, 28. Surface
26. Light extracting features
30. Extruder
32. Thermoplastic material
34. Base
36. Supply
38. Nip area
40. Support
42. Patterned roller
44. Film
46. Roll
50. Patterned belt
52. Cavity
54. Stylus
60. Cutting-in region
62. Near-flat region
64. Cutting-out region
66. Reflective surface
80. Coater
82. Carrier
84. Material
90. UV radiation
100. Molding apparatus
110. Fabrication apparatus
A. Apex curvature
C1, C2, C3. Cross-section
L. Length
W. Width
P1, P1', P2, P3. Position
T1, T1'. Cross-section

The invention claimed is:

1. A light-guiding article comprising:
a film substrate that has at least one patterned surface comprising a plurality of discrete surface features and an incident edge that is substantially orthogonal to the at least one patterned surface,
wherein each surface feature in the plurality of discrete surface features extends along a length direction that is substantially parallel to the incident edge;
and wherein, taken in cross-section along the length direction, each surface feature has a positively sloped portion, a substantially flat portion, and a negatively sloped portion and wherein a first widthwise cross-section taken at a first position through the positively sloped portion, a second widthwise cross-section taken at a second position through the negatively sloped portion and a third widthwise cross-section taken at a third position through the substantially flat portion have the same widthwise characteristic cross-sectional shape throughout.

2. The light-guiding article of claim 1 wherein the film substrate is a polymer material.

3. The light-guiding article of claim 1 wherein surface features in the plurality of surface features protrude from the patterned surface.

4. The light-guiding article of claim 1 wherein surface features in the plurality of surface features are indented into the patterned surface.

5. The light-guiding article of claim 1 wherein the first and second widthwise cross-sections are triangular in shape.

6. A light-guiding article comprising:
a film substrate that has at least one patterned surface comprising a plurality of discrete surface features and an incident edge that is substantially orthogonal to the at least one patterned surface,
wherein each surface feature in the plurality of discrete surface features extends along a length direction that is substantially parallel to the incident edge;
and wherein,
taken in cross-section along the length direction, each surface feature has a positively sloped portion, a substantially flat portion, and a negatively sloped portion; and widthwise cross-sections within the same surface feature, taken orthogonal to the length direction, have the same apex curvature throughout.

* * * * *